May 6, 1958 R. S. WOODRUFF, SR 2,833,296
SUN VISOR VENTILATING CONVERTIBLE BOAT TOP
Filed April 1, 1957 3 Sheets-Sheet 1

INVENTOR.
RALPH S. WOODRUFF
BY
*Harry B. Look*
ATTORNEY

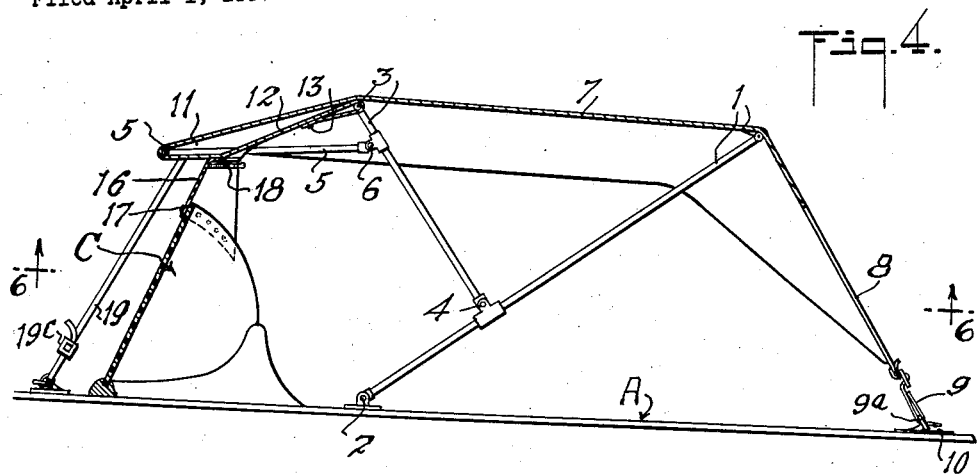
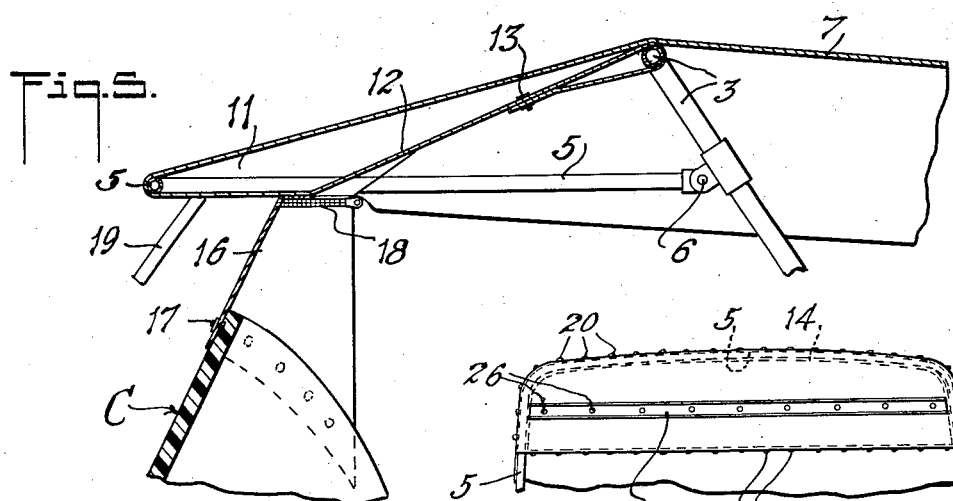
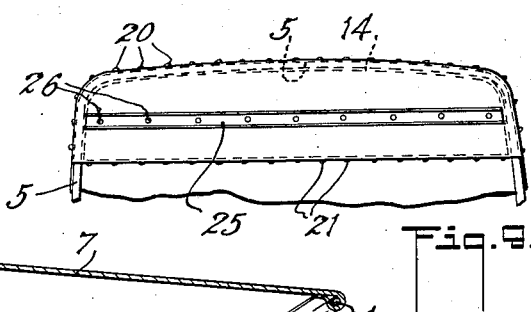
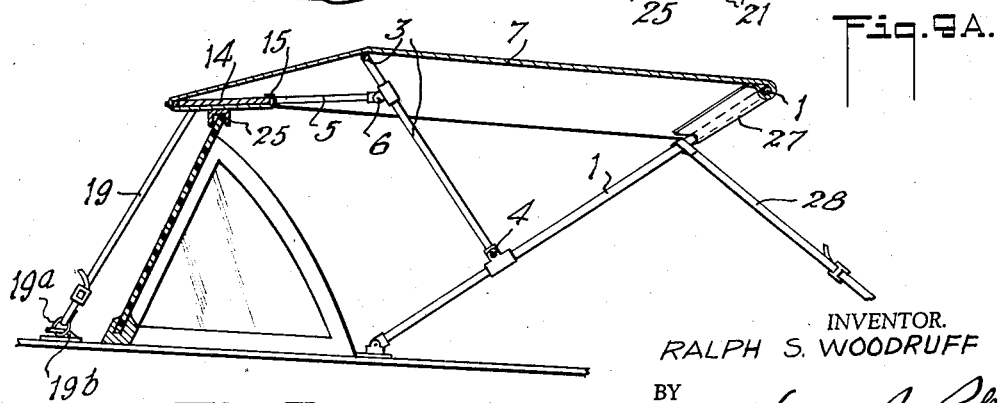

May 6, 1958 R. S. WOODRUFF, SR 2,833,296
SUN VISOR VENTILATING CONVERTIBLE BOAT TOP
Filed April 1, 1957 3 Sheets-Sheet 3
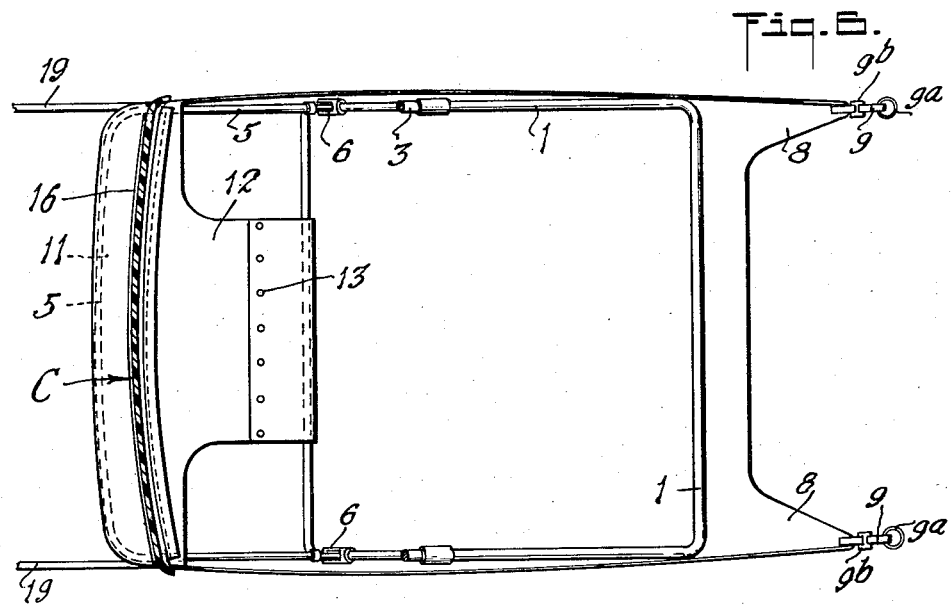
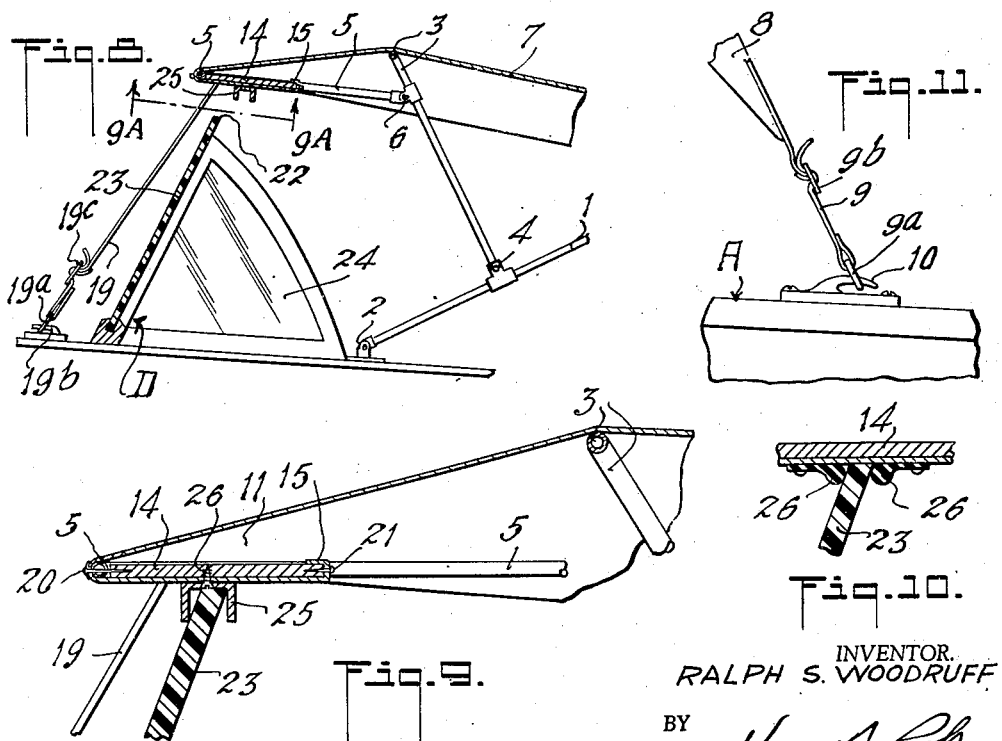
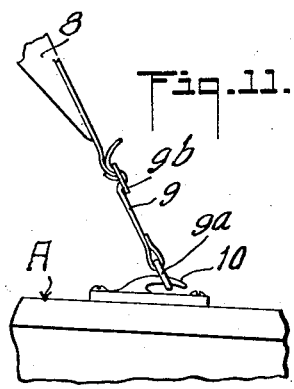
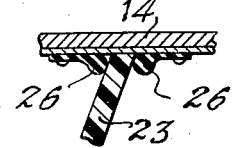
INVENTOR.
RALPH S. WOODRUFF
BY
*Harry N. Cook,*
ATTORNEY

United States Patent Office 2,833,296
Patented May 6, 1958

2,833,296

SUN VISOR VENTILATING CONVERTIBLE BOAT TOP

Ralph S. Woodruff, Sr., Point Pleasant, N. J.

Application April 1, 1957, Serial No. 649,807

4 Claims. (Cl. 135—6)

This invention relates to foldable or convertible tops for boats, particularly small motor driven boats. The invention especially contemplates a boat top for use in conjunction with a transparent windshield.

According to known practice, boat tops include foldable metal frames supporting a canvas cover the forward edge of which is separably fastened to the upper edge of the windshield. The main portion of the top is made of adequate height for persons to sit thereunder and generally the windshield is considerably less in height than said main portion of the top so the forward portion of the canvas top frequently slopes forwardly and sharply downwardly to the windshield. With this construction, there is no passage for air from the bow of the boat to the space beneath the top and in hot weather, the space beneath the top and immediately behind the windshield becomes intolerably hot. Also, the downwardly sloping forward portion of the cover often requires the boat operator to assume an uncomfortable position in order to gain a clear view ahead. Moreover, frequently it is necessary to mount a separate visor on the front of the windshield to protect the boat operator from the rays of the sun.

Prime objects of the present invention are to provide a foldable top for boats which shall overcome the above-mentioned objections to and disadvantages of known boat tops, and to provide a novel and improved boat top which shall at the same time provide adequate space for the boat operator, adequate ventilation and a sun visor.

Another object is to provide a novel and improved combination of a boat windshield and a top which can be adjusted so as to engage the top of the windshield or into a position in spaced relation to the top of the windshield to provide ventilation when desired and to provide at all times a sun visor projecting forwardly beyond the top of the windshield.

A further object is to provide such a boat top which shall also include a removable or adjustable curtain between the top and the windshield to protect the boat operator against high winds and rain, when necessary.

Other objects, advantages and results of the invention will be brought out by the following description in conjunction with the accompanying drawings in which—

Figure 4 is a vertical sectional view approximately on the plane of the line 4—4 of Figure 2;

Figure 5 is a greatly enlarged fragmentary sectional view similar to Figure 4 illustrating the forward end of the boat top;

Figure 6 is an enlarged horizontal sectional view approximately on the plane of the line 6—6 of Figure 4;

Figure 7 is a fragmentary sectional view similar to Figure 4 showing a modification of the invention, with the top in engagement with the windshield;

Figure 8 is a view similar to Figure 7 showing the top adjusted into a position in spaced relation to the top of the windshield;

Figure 9 is an enlarged fragmentary central vertical sectional view of the forward portion of the boat top and the upper portion of the windshield as illustrated in Figure 7;

Figure 9A is a fragmentary bottom view of the windshield approximately from the plane of the line 9A—9A of Figure 8;

Figure 10 is a fragmentary sectional view showing a further modification of the connection between the boat top and the windshield;

Figure 11 is a fragmentary side elevational view of the means for attaching the rear end of the boat top to the boat.

Figure 1:
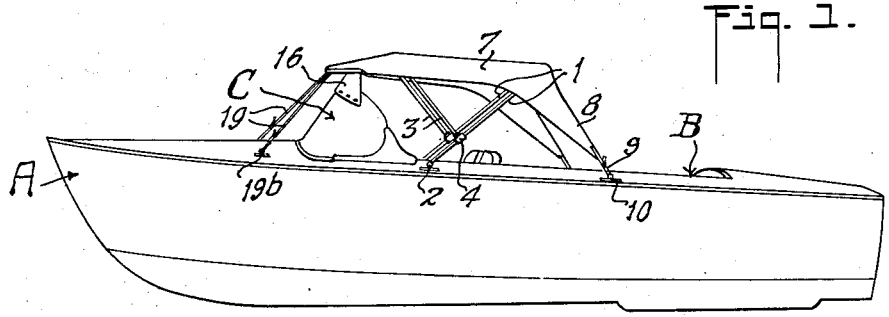
Figure 1 is a side elevation of a sun visor ventilating convertible boat top embodying the invention, mounted on a boat.
Figure 2:
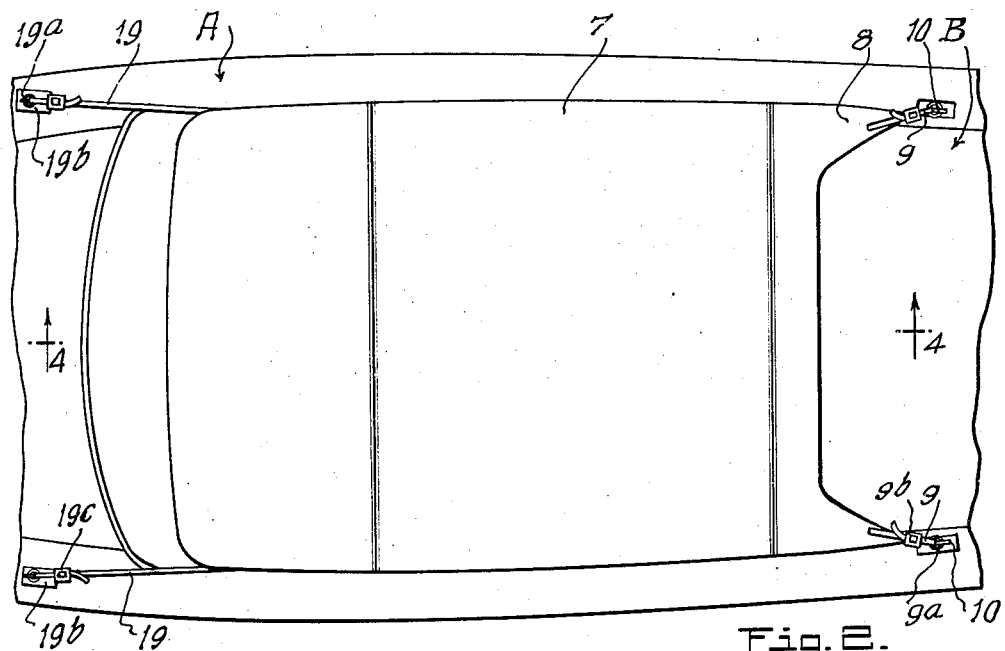
Figure 2 is a fragmentary enlarged top plan view thereof.
Figure 3:
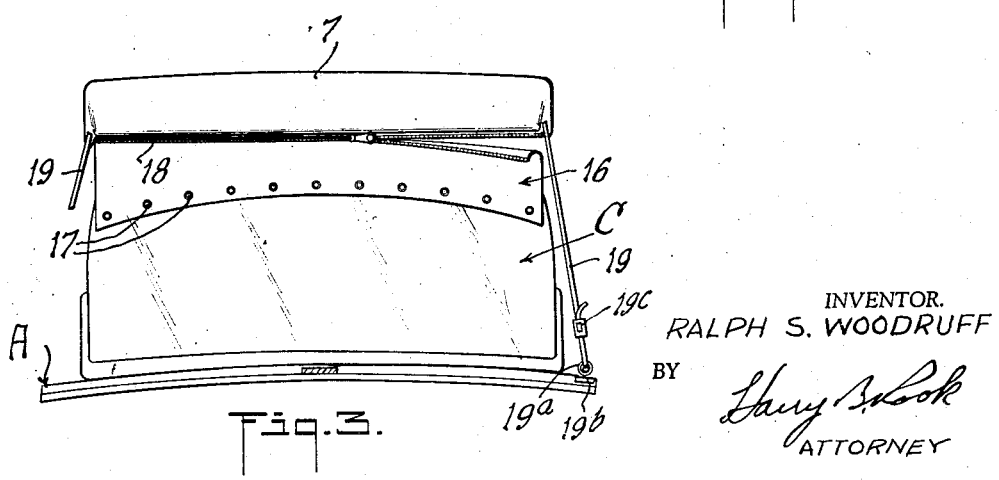
Figure 3 is a fragmentary front elevational view thereof.

For the purpose of illustrating the principles of the invention I have shown it in conjunction with a known type of small power driven boat A having the usual cockpit B and a transparent windshield C at the forward end of the cockpit.

The boat cover embodying the invention is shown as comprising a foldable frame that includes a main U-shaped frame piece or bow 1 that has the ends of its arms pivotally connected at 2 to the deck or gunwale of the boat. A secondary U-shaped member or bow 3 has the ends of its arms pivotally connected at 4 to the respective arms of the frame member 1, and when the top is installed the main bow 1 inclines rearwardly and the secondary bow 3 inclines forwardly. An auxiliary U-shaped frame member or bow 5 has its arms pivotally connected at 6 to the respective arms of the secondary frame member 3 and extends approximately horizontally forwardly beyond and in vertically spaced relation to the top edge of the windshield C, when the boat top is in operative position. A flexible canvas cover 7 is supported by the frame members 1 and 3 in the usual manner and has rear flap portions 8 separably secured to the boat deck in the usual manner as by straps 9 connected to the flaps and having rings 9a attached to hooks 10 on the boat deck. At the forward end of the canvas cover is a pocket 11 opening inwardly of the top toward the secondary member 3 and into which extends the forward end or bight of the auxiliary frame member 5; and the forward end portion of the cover is held tautly between the forward end of the auxiliary frame member 5 and the secondary frame member 3 as best shown in Figure 5. Preferably the inner edge of the pocket has an extension strap 12 attached thereto, extending rearwardly and wrapped around the secondary frame member 3 to hold the forward end of the cover against accidental displacement from the auxiliary frame member in, for example, high winds. Conveniently, the strap 12 may be separably attached to the frame member 3 by the use of a snap fastener 13 for connecting the end of the strap to the intermediate portion thereof, as best shown in Figure 5.

Cooperating with the straps 9 for holding the top in the desired position, are front straps 19 that have rings 19a attachable to hooks 19b on the deck. Desirably the straps 9 and 19 are adjustable by means of, for example, the respective buckles 9b and 19c.

With the construction so far described, it will be observed that when the boat top is erected and is in operative position as shown in Figures 1, 4 and 5, the forward end portion of the top projects forwardly beyond the top edge of the windshield so as to serve as a sun visor for the operator behind the windshield; and said forward portion of the top is also spaced above the top edge of the windshield so as to provide a ventilating passage to permit the flow of air freely beneath the top from the bow of the boat.

In many instances, for example in stormy weather, it will be desirable to close said space between the windshield and the boat top to protect the operator of the boat from high winds and rain. Accordingly, an apron, curtain or valance 16 is provided. It may be formed of suitable material such as canvas, or it may be formed of transparent sheet plastic material. The upper edge of the apron is connected to the cover, preferably at the inner edge of the pocket 11, while the lower edge of the apron is shaped to conform to the upper edge of the windshield and may be separably fastened to the windshield by head and socket fasteners 17 in known manner.

Preferably, also the apron is detachable from the cover and conveniently this may be effected by the use of an ordinary slide fastener or "zipper" 18, one portion of which may be secured to the cover 7 while the other portion may be secured to the upper edge of the apron. With such a construction the apron can be easily and quickly installed or removed as may be desired.

A modification of the invention is shown in Figures 7-9A inclusive where instead of the extension strap 12 for holding the forward end of the cover against displacement from the auxiliary frame member 5, a flat stiff sheet 14 of suitable material such as plywood, may be inserted into the pocket 11 and secured to the frame member 5 in any suitable manner as by nails or screws 20, and having its rear edge secured, as by tacks 21, to an inturned flap 15 on the inner end of the pocket.

Another modification of the invention comprises means for causing direct and easily separable engagement of the forward end of the top with the upper edge 22 of a known type of windshield D that has a rectangular flat front portion 23 and flat side wings 24. As shown in Figures 7-9A inclusive, an inverted channel piece 25 is secured as by screws 26 to the under side of the pocket 11 and the stiff sheet 14 therein, the arms of the channel being spaced apart a distance to freely receive the upper edge 22 of the windshield between them as shown in Figures 7 and 9. With this arrangement, a weathertight connection is afforded between the boat top and the front portion of the windshield, but if desired, the top may be tilted rearwardly as shown in Figure 8 to provide a space between the front end of the top edge of the windshield. This adjustment of the top can be made by proper shortening and lengthening of the straps 9 and 19. In both positions, the forward portion of the top projects beyond the top edge of the windshield to serve as a visor.

In Figure 10 is shown a substitute for the channel 25 of Figures 7-9A inclusive. Here two strips 26 of rubber or the like are secured to the sheet 14 at the under side of the pocket 11 with their edges in juxtaposed spaced relation to receive the upper edge of the front portion 23 of the windshield between them. Other modifications of this structure will occur to those skilled in the art.

It will also be understood by those skilled in the art that instead of utilizing the apron or valance 16, the boat top that is shown in Figure 1 could be tilted forwardly to cause snug engagement of the forward portion of the top with the upper edge of the windshield.

If desired, the flaps 8 might be omitted from the top, and the rear end of the cover could be secured around the bight portion of the main frame member 1 as indicated at 27 in Figure 7, in which case the straps could be directly connected to the frame member 1 as indicated at 28 in Figure 7.

The boat top of the invention provides adequate space for the operator of the boat beneath the top and provides for full and clear vision as well as for adequate ventilation; and at the same time, the cover provides an efficient, simple and attractive sun visor which is automatically brought into operation with the erection of the top. Furthermore, when the weather requires it, the ventilating space between the top and the windshield may be closed to protect the operator from wind, rain and spray.

While the now preferred embodiment of the invention has been illustrated and described, it will be understood by those skilled in the art that many modifications and changes in the construction and combination of the top with a boat windshield may be made within the spirit and scope of the invention.

What I claim is:

1. The combination with a boat having a windshield and a space for an operator therebehind, of a top above said space including a frame having a portion extending substantially horizontally forwardly beyond the upper edge of the windshield providing a sun visor, said frame comprising a U-shaped main member having its arms pivotally connected to said boat and inclined rearwardly, a secondary U-shaped member having its arms pivotally connected to the arms of said main member and inclined forwardly, and an auxiliary U-shaped member having its arms pivotally connected to the arms of said secondary member and extending substantially horizontally forwardly beyond the upper edge of said windshield, a flexible cover lying upon the bights of said frame members and having a pocket at its forward end opening inwardly of the top toward said secondary member and in which the bight of said auxiliary member is disposed, and means connecting respectively the forward end and the rear end of cover to said boat.

2. The combination as defined in claim 1 wherein said auxiliary member is vertically spaced from the upper edge of said windshield and with the addition of a curtain depending from said cover and having one edge portion separably connected to the upper edge portion of said windshield.

3. The combination as defined in claim 2 wherein the inner edge of said pocket has a tying strap extending therefrom and connected to said secondary frame member.

4. The combination with a boat having a windshield and a space for an operator therebehind, of a top above said space including a frame having a portion extending substantially horizontally forwardly beyond the upper edge of the windshield providing a sun visor, said frame comprising a U-shaped main member having its arms pivotally connected to said boat and inclined rearwardly, a secondary U-shaped member having its arms pivotally connected to the arms of said main member and inclined forwardly, and an auxiliary U-shaped member having its arms pivotally connected to the arms of said secondary member and extending substantially horizontally forwardly beyond the upper edge of said windshield, a flexible cover lying upon the bights of said frame members and having a pocket at its forward end opening inwardly of the top toward said secondary member and in which the bight of said auxiliary member is disposed, means connecting respectively the forward end and the rear end of said cover to said boat, a flat stiff piece of material secured in said pocket and within the bight of said auxiliary frame member, and means secured to said piece of material beneath said pocket and providing a channel to embrace the upper edge of said windshield.

References Cited in the file of this patent

UNITED STATES PATENTS

| 1,792,191 | Smith | Feb. 10, 1931 |
| 1,878,393 | Grier | Sept. 20, 1932 |

FOREIGN PATENTS

| 488,728 | Canada | Dec. 9, 1952 |
| 657,238 | France | Jan. 12, 1929 |